Patented Mar. 27, 1951

2,546,798

UNITED STATES PATENT OFFICE 2,546,798

SOLUBLE COPOLYMERS OF ALLYLIC MALEATES WITH ALLYLIC ALCOHOLS

Pliny O. Tawney, Passaic, N. J., assignor to United States Rubber Company, New York, N. Y., a corporation of New Jersey No Drawing. Application February 7, 1946, Serial No. 646,217

4 Claims. (Cl. 260—78.5)

My invention comprises a method for preparing a new class of unsaturated polymeric materials of relatively low molecular weight which are soluble in a variety of organic liquids, but which are convertible to insoluble, infusible resins in the presence of heat and/or catalysts, by further polymerization or by copolymerization with reactive compounds containing an ethylenic linkage. More particularly, my invention relates to unsaturated, polymeric materials derived from a diallylic maleate.

It is well-known that the polymerization of diallylic maleates leads to the formation of an insoluble gel after a relatively small amount of the monomer has been converted to the polymeric form. Such products which generally consist of a small amount of insoluble polymer suspended in and swollen by the large amount of unreacted monomer, together with some low molecular weight polymer, are difficult to manipulate in various processing operations and are virtually useless for coating, molding, laminating, and other technical operations, where a soluble, fusible, unsaturated resin is required, which after application can be cured to an insoluble, infusible state.

A number of devices have been proposed to overcome these disadvantages. A common procedure recommended in U. S. Patent No. 2,273,891, U. S. Patent No. 2,320,536, and elsewhere, consists in halting the polymerization reaction before gelation occurs so as to obtain a soluble, fusible polymer. However, the amount of the conversion of monomer to polymer by this method is of necessity even lower than in the case cited above and the reaction product must be laboriously purified to free it from the large amount of unreacted starting material, while the latter in turn must be isolated and recycled for use in subsequent polymerizations. Such a process is obviously both inefficient and uneconomical, the more so since it is emphasized in U. S. Patent No. 2,221,663 that the processing of reaction products secured by this method must be conducted with extreme care to avert premature gelation.

Increased yields of ungelled polymer have been reported (e. g., in U. S. Patents Nos. 2,273,891 and 2,370,578) to be obtained by carrying out the polymerization at elevated temperatures and/or in the presence of large amounts of peroxidic catalysts. However, since the rate of the polymerization is markedly accelerated under such vigorous conditions, the reaction is less amenable to control, particularly in reaction vessels of industrial size, and premature gelation of the reaction mixture becomes even more difficult to avert. Moreover, the use of large amounts of peroxidic catalyst appreciably increases the overall cost of the process and tends to contaminate the resulting polymer with catalyst fragments and decomposition products.

Polymerization of a diallylic maleate in the presence of inert solvents has also been reported to improve the yield of the soluble, fusible product obtained prior to gelation, particularly when the reaction is carried out in dilute solution. However, the conversion of the monomer to polymer by this method is still comparatively inefficient and the large volumes of solvents commonly employed decrease the production capacity of the reaction vessel. Moreover, the rate of polymerization tends to decrease in dilute solution particularly at the low reaction temperature attainable by refluxing solutions of the monomer in low-boiling solvents such as acetone which is commonly employed by the art. The recommended use of inhibitors such as hydroquinone or copper salts to delay gelation of the polymerizing reaction mixture is likewise objectionable since in practice it is necessary to carry out a very careful and complete separation of the inhibitor from the polymeric product to avoid discoloration of the latter as well as retardation or complete inhibition of its subsequent conversion to the insoluble, infusible state. On a commercial scale such a purification is particularly laborious and time-consuming and adds to the operating cost of the process.

The copolymerization of a diallylic maleate with other polymerizable monomers also leads rapidly to the formation of insoluble products before more than a minor proportion of the diallylic maleate has become incorporated in the copolymer. Thus in U. S. Patent No. 2,181,739 it is stated that the copolymerization of a vinyl compound such as methyl methacrylate with a fraction of a percent of diallyl maleate yields an insoluble gel, while U. S. Patent No. 2,311,607 discloses the formation of an insoluble product by the copolymerization of styrene with as little as 6% of diallyl maleate. Similarly in U. S. Patent No. 2,340,111 it is shown that the copolymerization of a mixture of acrylic acid and vinyl acetate with approximately 11% of diallyl maleate yields an insoluble resin. Hence, this device is in no way superior to the methods previously mentioned and is consequently open to the same objections, i. e., only low yields of soluble, fusible polymers are obtained and only a minor amount of the diallylic maleate can be converted to the polymeric form before insolubilization occurs.

I have unexpectedly discovered that by polymerizing a mixture of a diallylic maleate with an unsaturated monomer which itself possesses little tendency to homopolymerize readily, particularly a 2-alkenyl alcohol, more specifically an allylic alcohol, a soluble, fusible, unsaturated copolymer can be readily obtained. In further contrast to the prior art, the preparation of my new copolymers, by which the major proportion of the diallylic maleate can be converted to the copolymeric form without insolubilization, proceeds smoothly at moderate temperatures and in the absence of inert solvents, inhibitors, excessive amounts of catalyst and other special reaction conditions or precautions heretofore employed by the art to avert premature gelation.

The resulting soluble, unsaturated copolymers, are uniform and homogeneous in character since they are uncontaminated by the insoluble gel encountered in many of the prior art polymers of diallylic maleates, and hence the necessity for extensive purification of my products is eliminated. My new copolymers are totally soluble in a number of common organic solvents, and they cure rapidly and completely to the insoluble, infusible state with little or no discoloration even when heated at 200° C.

In this latter respect, unlike many prior art polymers, such as those dislosed in U. S. Patent No. 2,370,562, the conversion of my products to the insoluble, infusible state by further polymerization is not inhibited by air (i. e., oxygen). Hence, the industrial application of my copolymers does not require the special equipment or other devices which the art has often found necessary to employ in order to exclude air during casting, molding, coating, laminating, and other processing operations wherein the resin is to be cured to the insoluble, infusible state. Still more important is the fact that air (or oxygen) actually promotes the curing of my copolymers not only at elevated temperatures such as 200° C. but also at more moderate temperatures, e. g., 25-100° C., preferably in the presence of certain metals or their salts known to the art as "driers," and the resulting solvent and heat-resistant products are tough, durable and tack-free. Hence, my copolymers are particularly useful as resin "bases" for coating compositions.

In addition to their manifest utility my new copolymers are unique in regard to their chemical structure since a soluble, fusible unsaturated copolymer of a diallylic maleate and an allylic alcohol is unknown in the prior art. It has been stated in U. S. Patent No. 2,332,900 that an insoluble, infusible, saturated polymer of a diallyl ester can be hydrolyzed, and it is conceivable that a partial hydrolysis of polymerized diallyl maleate, for example, might possibly lead to a product which could be formally regarded as a copolymer of diallyl maleate and allyl alcohol. However, such a material would be cross-linked and hence insoluble. Moreover, it would contain no unsaturation and would therefore be incapable of further polymerization. Thus such products, even if capable of formation, would be entirely useless in the very applications to which my soluble, unsaturated copolymers are so ideally suited.

My products are true copolymers as proven by specific tests. They contain attached to the polymer chain unsaturated ester groups which enable the copolymers to undergo further polymerization to the insoluble, infusible state. The presence of side-chain ester groups of the carballyloxy type enables my copolymers to undergo alcohol interchange reactions with either saturated or unsaturated alcohols, as well as with the adjacent hydroxyl groups of the copolymer itself, the latter yielding a modified copolymer containing sidechain cyclic ester, or lactone, groups. The hydroxyl groups in my copolymers also permit other modifications through treatment with agents known to react with primary alcohols, such agents including alkyl, allylic and acyl halides, organic acids and their anhydrides, organic isocyanates and isothiocyanates, aldehydes, etc., as well as the corresponding polyfunctional compounds such as the dihalides, diisocyanates, polycarboxylic acids, etc. In this manner the properties of my copolymers can be varied over a considerable range to yield other useful products.

The 2-alkenyl alcohols which are useful in my invention are represented by the type formula $$R—CH=C(R')—CH_2OH$$

where R and R' can be hydrogen or alkyl, e. g., methyl and ethyl; and where R or R' is hydrogen when the other is alkyl. Exemplary of these alcohols are allyl alcohol, 2-methylallyl alcohol, 3-methylallyl alcohol (i. e., crotyl alcohol) and 2-ethylallyl alcohol. Of the operable diallylic maleates, diallyl maleate and the di-2-alkylallyl maleates, e. g., dimethallyl maleate, are preferred.

The relative proportions of the diallylic maleate and the 2-alkenyl alcohol can be varied over a considerable range depending upon the physical properties desired in the resulting product. Copolymerization of the diallylic maleate with as little as approximately 7% of the 2-alkenyl alcohol (based on the weight of the diallylic maleate) is sufficient to repress the gelation of the reaction mixture during the early stages of the copolymerization and to insure an increased yield of soluble, unsaturated product. The larger the amount of the copolymerizable allylic alcohol present, the larger the amount of the monomeric diallylic maleate which can be converted to the copolymeric form without insolubilization; as much as 300% of the 2-alkenyl alcohol can be employed to attain the optimum yield of soluble copolymer. This method of my invention is not comparable to the polymerization of a diallylic maleate in the presence of an inert diluent as mentioned in U. S. Patent No. 2,273,891 and elsewhere, since the unsaturated alcohols which I employ actually copolymerize with the diallylic maleate and concurrently facilitate a much higher conversion of the diallylic maleate to the polymeric form than can possibly be obtained by substituting for the allylic alcohol an equal quantity of an inert non-copolymerizable solvent.

Since my copolymers are readily soluble in allylic alcohols, the copolymerizations may be carried out in the presence of a large excess, e. g., 500%, of the allylic alcohol, if desired, for the resulting mobile free-flowing solutions are easily handled in transfer, mixing, storage and other mechanical operations to which the copolymers themselves may be less amenable.

In the preparation of my new copolymers, the reaction temperatures may range from about 25° C. up to the reflux temperature of the reaction mixture and for overall economy it is preferable to operate in the upper part of this range. Higher temperatures can be employed but the necessary pressure equipment entails additional expense without offering any marked compensating advantages. Suitable polymerization catalysts include hydrogen peroxide, diacetyl peroxide, acetyl benzoyl peroxide, dibenzoyl peroxide, tertiary-butyl perbenzoate, tertiary-butyl hydrogen peroxide, urea peroxide and succinyl peroxide. In contrast to the prior art (e. g., U. S. Patent No. 2,279,881), the so-called acidic-type catalysts, e. g., sulfuric acid, aluminum chloride and boron trifluoride are not effective for the preparation of my new copolymers of diallylic maleates, and hence the above mentioned peroxidic-type catalysts are preferred, the concentration of catalyst being maintained preferably in the range from 1 to 5 mole percent of the mixture of copolymerizable monomers.

The course of the copolymerization can be followed by observing the increase in the viscosity of the reaction mixture, and after halting the reaction by cooling, the copolymer can be isolated from the reaction mixture by distilling off any unreacted starting materials, preferably under diminished pressure, or by extracting them with a solvent in which the copolymer is insoluble. Although unnecessary for most commercial applications, my copolymers can be further purified for analysis or for specialized uses such as the preparation of optical castings, by dissolving the copolymers in a solvent such as chloroform or acetone and precipitating them with a non-solvent, e. g., an aliphatic hydrocarbon such as n-hexane.

The resulting polymeric materials can be cast or molded in a known manner to form rods, blocks, sheets, etc. Alternatively, they can be dissolved in appropriate solvents and employed as coating or impregnating compositions. In the preparation of such solutions it is unnecessary to isolate the copolymer as is frequently done in the prior art, for higher boiling solvents can be added directly to the crude copolymerization reaction mixture and any volatile unreacted starting materials can then be removed by fractional distillation. This procedure effects a further saving in both the time and the expense of the process and adds to the economic advantage of my products.

Application of heat to compositions containing my copolymers, particularly in the presence of catalysts, induces further polymerization and the resulting cross-linked products possess good dimensional stability even at elevated service temperatures and are strongly resistant to attack by solvents. Since this conversion is not inhibited by air it is unnecessary to cure my copolymers by prior art devices, e. g., in an inert atmosphere, between protective foils, in special ovens, etc., and hence my products are particularly useful in molding and laminating large objects of complex shape, in the continuous impregnation of textiles and fabrics and in the rapid coating of wood and metal articles fabricated by mass-production methods. Suitable dyes, pigments, fillers, plasticizers and resins can be incorporated with my copolymers at the soluble, fusible stage prior to final cure.

My copolymers can also be converted to the insoluble, infusible state by interpolymerization with reactive compounds containing an ethylenic linkage, e. g., diethyl fumarate, diallyl fumarate, etc. At the soluble stage my copolymers dissolve readily in a number of these reactive monomers to form solutions which are often quite fluid even at high solids content. Such solutions can be totally polymerized leaving no solvent to be evaporated, and are useful not only as coating compositions but particularly in casting, laminating and impregnating operations where articles capable of being preformed and then "set" or cured in a final shape with minimum shrinkage are desired.

The following examples disclose my invention in more detail; all parts being by weight:

EXAMPLE 1

This illustrates my discovery that by copolymerizing a diallylic maleate with a 2-alkenyl alcohol, gelation of the reaction mixture is repressed and an increased yield of soluble, unsaturated polymeric material is thereby obtained.

Mixtures of diallyl maleate with 2-alkenyl alcohols in various proportions are heated at 60° C. with benzoyl peroxide as catalyst until the points of incipient gelation are attained. The reactions are then halted by cooling, and the reaction mixtures are poured into a commercial grade of n-hexane. The precipitated copolymers are further purified by repeated solution in acetone and precipitation with n-hexane and after drying in vacuo to constant weight the amounts of the polymeric products are determined.

The pertinent data are summarized in Table I, including the weights of the copolymerizable monomers, peroxide catalyst and the polymeric products as well as the reaction times. For purposes of comparison only, the polymerization of diallyl maleate in the absence of a copolymerizable alcohol (I–a), and in the presence of an inert diluent, benzene (I–g, –h), are included to demonstrate more clearly the advantages of my invention.

*Table I*

| | Diallyl Maleate | Allyl Alcohol | 3-Methyl-allyl Alcohol (crotyl alcohol) | Benzene | Benzoyl Peroxide | Reaction Time (Hours) | Polymeric Product |
|---|---|---|---|---|---|---|---|
| a | 100 | | | | 1.23 | 7.0 | 18.4 |
| b | 100 | 7.4 | | | 1.53 | 14.75 | 27.4 |
| c | 100 | 19.7 | | | 2.02 | 46.5 | 40.0 |
| d | 100 | 44.5 | | | 9.20 | 38.0 | 61.3 |
| e | 100 | 69.0 | | | 12.10 | 51.0 | 90.0 |
| f | 100 | | 24.5 | | 4.08 | 160.0 | 33.7 |
| g | 100 | | | 19.7 | 2.20 | 6.3 | 20.6 |
| h | 100 | | | 100.0 | 2.20 | 7.9 | 32.0 |

Comparison of I–a and I–b above shows the pronounced effect of copolymerizing even small amounts of 2-alkenyl alcohol with a diallylic maleate in repressing gelation and increasing the yield of soluble, unsaturated polymeric material. Examples I–c, –d and –e show that as the amount of the copolymerizable alcohol in the initial reaction mixture is increased, correspondingly higher conversions of the monomeric diallylic maleate to the copolymeric form can be achieved without insolubilization of the reaction mixture. Example I-*f* illustrates the use of an alkyl-substituted allyl alcohol in my invention.

The advantages of my invention over the prior art are emphasized by reference to Examples I-*a*, I-*g* and I-*h*, which show the relatively small effect exerted by an inert diluent in increasing the yield of soluble, polymeric product. Examples I-*e* and I-*g* show that the yield of soluble, unsaturated polymeric material is increased by approximately 100% when the copolymerizable allyl alcohol of my invention is substituted for an equal weight of an inert diluent such as is recommended by the art. Moreover, a comparison of Example I-*h* with I-*b* clearly demonstrates the inert diluent to be only about 10% as effective as the allyl alcohol in securing a comparable yield of soluble polymeric material. It is therefore obvious that in order to secure high yields, comparable to I-*e* above for example, by prior art methods, inordinately large amounts of an inert diluent must be employed, particularly since, as shown by a comparison of Examples I-*g* and I-*h*, an increase of even 400% in the amount of the inert diluent in the reaction mixture only raises the yield of soluble polymeric product by a relatively small amount.

EXAMPLE 2

A mixture of 51.6 parts of diallyl maleate, 69.6 parts of allyl alcohol and 6.75 parts of a 60% solution of tertiary-butyl hydrogen peroxide is heated at reflux for 29.5 hours. The reaction mixture is evacuated at 30° C. and 1 mm. pressure to a thick syrup which is then poured into n-hexane. The precipitated copolymer is further purified by solution in chloroform and precipitation with n-hexane and after drying to constant weight in vacuo 58.7 parts of polymeric solid are obtained.

*Analysis.*—Found: C, 61.96%; H, 7.39%; iodine (Wijs) No. 105.1; hydroxyl content 6.94%.

Since the theoretical carbon contents of diallyl maleate and allyl alcohol only differ by approximately 0.8%, no accurate estimate of the relative amounts of the two monomers in the copolymer can be adduced from the elementary analysis. However, the hydroxyl content corresponds to a copolymer containing at least 23.7% by weight of copolymerized allyl alcohol. The iodine number indicates the large amount of unsaturation in the copolymer which resides in the copolymerized diallyl maleate units of the polymer chain and which is available for further polymerization.

EXAMPLE 3

(a) A mixture of 58.8 parts of diallyl maleate, 98.6 parts of allyl alcohol and 6.0 parts of a 60% solution of tertiary-butyl hydrogen peroxide is heated at reflux for 24 hours. A 75-part aliquot of the reaction mixture is purified as in Example 2 above to yield 34.5 parts of copolymer which corresponds to a total yield of 75 parts of the copolymer from the entire reaction mixture.

A film prepared by evaporating a 5% solution of the copolymer in a carbon tetrachloride at room temperature displays a strong infra-red absorption band at 3300 cm. which indicates the presence of hydroxyl groups in the copolymer.

(b) An aliquot of 67.1 parts of the crude copolymerization reaction mixture from (a) above is admixed with 12.9 parts of monomeric diethyl fumarate and evacuated to a thick syrup. Twenty parts of benzene are then added to this syrup and evacuation is continued until the remainder of the unreacted allyl alcohol is removed as the alcohol-benzene azeotrope and the weight of the residual syrup amounts to approximately 45.5 parts. One part of benzoyl peroxide is admixed with the syrup, a portion of which is then heated at 90° C. for 10 minutes in a coverless mold to form a hard casting which is unattacked by boiling chloroform. The surface of the casting which has been exposed to the air during the curing operation is hard and completely tack-free which shows that air does not inhibit the polymerization of the products of my invention.

A similar hard and non-tacky casting is obtained by heating another portion of the above solution 24 hours at 60° C. in the presence of air.

EXAMPLE 4

A copolymer of allyl alcohol and diallyl maleate is prepared as in Example 3 above, and 50 parts of the crude copolymerization reaction mixture are vacuum-evaporated to a thick syrup. Seven parts of diethyl fumarate are added to the mixture which is distilled at 40° C. and 1 mm. pressure until 33 parts of residual syrup are obtained. This solution is admixed with 0.5 part of benzoyl peroxide and cured in a plate mold by heating for 16 hours at 60° and then for 3 hours at 90° C. The resulting tough sheet is insoluble in acetone and has a Barcol hardness of 25; Rockwell hardness of M85.

(a) An aliquot of 50 parts of the crude copolymerization reaction mixture is evaporated to a syrup, admixed with 3.5 parts of diethyl fumarate and distilled as above. Three and five-tenths parts of styrene and 0.5 part of benzoyl peroxide are added to the residual solution and cured in a plate mold as in the previous case. The resulting solvent and heat-resistant sheet has a Barcol hardness of 30.

(b) An aliquot of 50 parts of the crude copolymerization reaction mixture is diluted with 47.5 parts of cyclohexanone and the solution is distilled at approximately 50° C. and 1 mm. until the residue is concentrated to a thick syrup. The remainder of the unreacted allyl alcohol is then removed by adding 50 parts of benzene and continuing the distillation until approximately 70 parts of residual solution are obtained. To the solution is added 1 cc. of a solution of cobalt naphthenate containing 1% cobalt (prepared by diluting with xylene a 6% solution). The solution is spread on a glass panel and air-cured for 19 hours at room temperature (25°) to yield a hard, tough film which is insoluble in acetone. Another film is prepared from the solution by baking on a glass panel for 1.5 hours at 100° C. to yield a hard, tough coating which is unaffected by acetone.

A walnut veneer panel is varnished with three successive coats of the above solution, baking for 0.5 hours at 70° C. between each coat. The panel is finally baked at 70° C. for 16 hours to yield a clear, smooth finish which is completely resistant to acetone and 95% aqueous ethanol, and is inappreciably attacked after continuous contact with 2% aqueous sodium hydroxide for 1 hour.

EXAMPLE 5

A mixture of 103.2 parts of diallyl maleate, 100.8 parts of methallyl alcohol and 6.0 parts of a 60% solution of tertiary butyl hydrogen peroxide is heated at reflux for 22.5 hours. The reaction mixture is then poured into n-hexane and the precipitated copolymer is purified by repeated solution in chloroform and precipitation with n-hexane. After drying in vacuo to constant weight 116.6 parts of polymeric solid are obtained.

*Analysis.*—Found: Iodine number 92.2.

EXAMPLE 6

Ninety-eight parts of diallyl maleate are admixed with 144 parts of methallyl alcohol and 3.75 parts of a 60% solution of tertiary-butyl hydrogen peroxide and heated at reflux for 29.5 hours. An aliquot of the reaction mixture when purified as in the previous examples yields a polymeric solid whose weight corresponds to a yield of 71.7 parts of copolymer from the entire reaction mixture.

(a) An aliquot of 121 parts of the crude copolymerization reaction mixture is evacuated at 40° C. at 1 mm. until 77 parts of viscous syrup are obtained. Seven parts of diethyl fumarate are then added together with 2.25 parts of benzoyl peroxide and a portion of the resulting solution is cured in a mold by heating at 60° C. for 16 hours and then at 90° C. for 2 additional hours. A clear, hard and solvent-resistant product is obtained.

(b) Ninety-one and nine-tenths parts of the crude copolymerization reaction mixture are diluted with 45.7 parts of cyclo-hexanone and 2.0 cc. of a 1% cobalt naphthenate solution are added. A sample of this solution is poured onto a glass panel where it dries to a tack-free film in 3 hours at room temperature and is completely cured to a hard, tough solvent-resistant coating after 15 additional hours. Another portion of the solution is cured to a similar state by baking on a glass panel for 2 hours at 70° C. A walnut veneer panel is coated with a third portion of the solution, cured at room temperature for 50 minutes and then baked at 70° C. for 60 minutes. A second coat is then applied and cured at room temperature for 1.25 hours and then baked at 70° C. for 5 hours. The resulting clear, hard, glossy finish is unaffected by benzene and 91% aqueous ethanol.

EXAMPLE 7

A mixture of 39.2 parts of diallyl maleate, 21.6 parts of crotyl alcohol (3-methylallyl alcohol) and 2.25 parts of a 60% solution of tertiary-butyl hydrogen peroxide is heated at reflux for 12 hours. After cooling, an aliquot of 10 parts of the reaction mixture is thinned with 10 parts of acetone and 0.02 part of cobalt as cobalt naphthenate, is added. The solution is flowed onto a glass panel and allowed to stand at room temperature. A tack-free film is formed within 0.5 hour which hardens to a clear, acetone-insoluble coating after 16.5 additional hours. When another sample of this coating solution is baked on glass for 1 hour at 90° C., a clear, colorless, mar-resistant film is obtained which is unattacked by acetone.

Having thus described my invention, what I claim and desire to protect by Letters Patent is:

1. A soluble unsaturated copolymer of a diallylic maleate monomer wherein the allylic radical is selected from the class consisting of allyl and methallyl radicals with a 2-alkenyl alcohol having the formula $$R-CH=C(R')-CH_2OH$$

where one of the substituents R and R' is selected from the class consisting of hydrogen, methyl, and ethyl and the other is hydrogen, prepared from a polymerizable mix of said monomers, in which the proportion of the alcohol is at least 7% of the weight of the maleate.

2. A soluble unsaturated copolymer of diallyl maleate with allyl alcohol, containing residual unsaturation and being capable of further polymerization, prepared from a polymerizable mix of said monomers, in which the proportion of the alcohol is at least 7% of the weight of the maleate.

3. A soluble unsaturated copolymer of diallyl maleate with methallyl alcohol, containing residual unsaturation and being capable of further polymerization, prepared from a polymerizable mix of said monomers, in which the proportion of the alcohol is at least 7% of the weight of the maleate.

4. A method which comprises polymerizing in the presence of a peroxy compound catalyst a mixture of monomers consisting of a monomeric diallylic maleate wherein the allylic radical is selected from the class consisting of allyl and methallyl radicals and a 2-alkenyl alcohol having the formula $R-CH=C(R')-CH_2OH$ where one of the substituents R and R' is selected from the class consisting of hydrogen, methyl, and ethyl and the other is hydrogen, the proportion of the alcohol being at least 7% of the weight of the maleate, for a time sufficient to form a soluble, fusible copolymer of said monomers, and halting the reaction by cooling the reaction mixture whereby to avoid forming any appreciable amount of insoluble copolymer of said monomers.

PLINY O. TAWNEY.

REFERENCES CITED

The following references are of record in the file of this patent:

UNITED STATES PATENTS

| Number | Name | Date |
|---|---|---|
| 2,332,900 | D'Alelio | Oct. 26, 1943 |
| 2,378,195 | D'Alelio | June 12, 1945 |
| 2,441,516 | Snyder | May 11, 1948 |
| 2,504,052 | Snyder | Apr. 11, 1950 |